US011494523B2

(12) United States Patent
Basak et al.

(10) Patent No.: US 11,494,523 B2
(45) Date of Patent: Nov. 8, 2022

(54) DIRECT MEMORY ACCESS MECHANISM

(71) Applicant: Intel Corporation, Santa Clara, CA (US)

(72) Inventors: Abhishek Basak, Bothell, WA (US); Pradeep Pappachan, Tualatin, OR (US); Siddhartha Chhabra, Portland, OR (US); Alpa Narendra Trivedi, Hillsboro, OR (US); Erdem Aktas, Beaverton, OR (US); Ravi Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 16/993,469

(22) Filed: Aug. 14, 2020

(65) Prior Publication Data
US 2020/0372188 A1 Nov. 26, 2020

(51) Int. Cl.
*G06F 12/00* (2006.01)
*G06F 13/00* (2006.01)
*G06F 13/28* (2006.01)
*G06F 21/79* (2013.01)
*G06F 21/60* (2013.01)
*G06F 21/31* (2013.01)
*G06F 12/1081* (2016.01)
*G06F 12/14* (2006.01)
*G06F 21/57* (2013.01)

(52) U.S. Cl.
CPC .......... *G06F 21/79* (2013.01); *G06F 12/1081* (2013.01); *G06F 12/1441* (2013.01); *G06F 12/1483* (2013.01); *G06F 21/31* (2013.01); *G06F 21/575* (2013.01); *G06F 21/602* (2013.01); *G06F 2221/0755* (2013.01)

(58) Field of Classification Search
CPC .. G06F 21/79; G06F 12/1081; G06F 12/1441; G06F 12/1483; G06F 21/31; G06F 21/575; G06F 21/602; G06F 2221/0755
USPC .......................................................... 711/163
See application file for complete search history.

(56) References Cited

U.S. PATENT DOCUMENTS

| 2005/0114688 | A1* | 5/2005 | Leis | G06F 21/62 713/193 |
| 2008/0256599 | A1* | 10/2008 | Lee | G06F 21/70 726/2 |
| 2012/0042157 | A1* | 2/2012 | Leclercq | G06F 21/72 713/193 |
| 2019/0087575 | A1* | 3/2019 | Sahita | H04L 9/0618 |

\* cited by examiner

*Primary Examiner* — Edward J Dudek, Jr.
*Assistant Examiner* — Sidney Li
(74) *Attorney, Agent, or Firm* — Jaffery Watson Mendonsa & Hamilton LLP

(57) ABSTRACT

An apparatus to facilitate security of a shared memory resource is disclosed. The apparatus includes a memory device to store memory data, wherein the memory device comprises a plurality of private memory pages associated with one or more trusted domains and a cryptographic engine to encrypt and decrypt the memory data, including a key encryption table having a key identifier associated with each trusted domain to access a private memory page, wherein a first key identifier is generated to perform direct memory access (DMA) transfers for each of a plurality of input/output (I/O) devices.

18 Claims, 10 Drawing Sheets

| KeyID | Key |
|---|---|
| KID1 | K1 |
| KID2 | K2 |

FIG. 3A

| Device RegID | Device Owner | Device KeyID |
|---|---|---|
| D1 | TEE1 | KID1 |
| D2 | TEE2 | KID2 |
| D3 | TEE3 | KID3 |

FIG. 3B

| HPA | GPA | Page Owner | Page Type | Attributes |
|---|---|---|---|---|
| HPA1 | GPA1 | TEE1 | Shared | R,UC |
| HPA2 | GPA2 | TEE2 | Private | R |
| HPA3 | GPA3 | TEE1 | Private | W |

FIG. 3C

Allow DMA if:

1) Device ID hit in DMAT:

<u>- MOT hit (HPA)</u>
- Device Owner == Page Owner
- Page Type == Private
- Device GPA = MOT GPA and attributes match <u>- MOT miss(HPA)</u>
- Raise Fault 2) Device ID miss in DMAT:

<u>- MOT hit (HPA)</u>
- Page Type == Shared

<u>- MOT miss (HPA)</u>
- Check KeyID not in TD (Private) KeyID range, else raise fault

FIG. 4

| KeyID | Key |
|---|---|
| KID1 | K1 |
| KID2 | K2 |
| IOKEYID | K3 |

FIG. 5A

| Device RegID | Device Owner |
|---|---|
| D1 | TEE1 |
| D2 | TEE2 |
| D3 | TEE3 |

FIG. 5B

| HPA | GPA | Page Owner | Page Type | |
|---|---|---|---|---|
| HPA1 | GPA1 | TEE1 | Shared | R,UC |
| HPA2 | GPA2 | TEE2 | Private | R,IO |
| HPA3 | GPA3 | TEE1 | Private | W,IO |

FIG. 5C

DIRECT MEMORY ACCESS MECHANISM

BACKGROUND OF THE DESCRIPTION

Trusted computing platforms have defined secure boot and device authentication that provide security for hardware components included in the platform. Trust Domain Extensions (TDX) provides a trusted platform that is implemented to guarantee isolation and data security (e.g., confidentiality and integrity) of tenant virtual machines (VMs) in cloud servers in the presence of a potentially untrustworthy cloud service provider (CSP). An untrustworthy CSP may manifest itself via a malicious virtual machine monitor and/or a rogue system/infrastructure administrator.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit other equally effective embodiments.

FIG. 3A illustrates one embodiment of a Key Encryption Table.

FIG. 3B illustrates one embodiment of a Device Micro-architectural Table.

FIG. 3C illustrates one embodiment of a Memory Ownership Table.

FIG. 4 illustrates one embodiment of access control checks.

FIG. 5A illustrates another embodiment of a Key Encryption Table.

FIG. 5B illustrates another embodiment of a Device Micro-architectural Table.

FIG. 5C illustrates another embodiment of a Memory Ownership Table.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a single key identifier is implemented to perform direct memory access (DMA) transfers to access private memory pages for each of a plurality of input/output (I/O) devices in a cloud computing platform.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
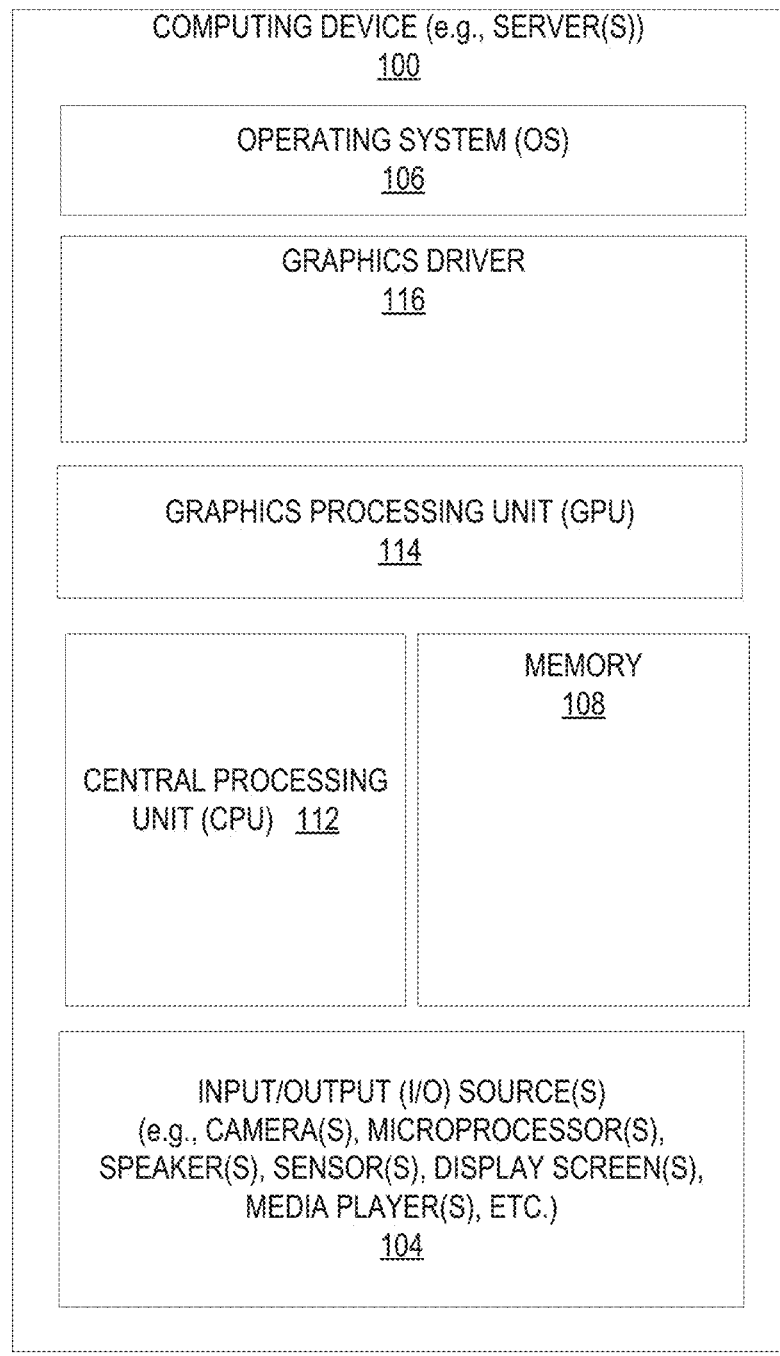
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
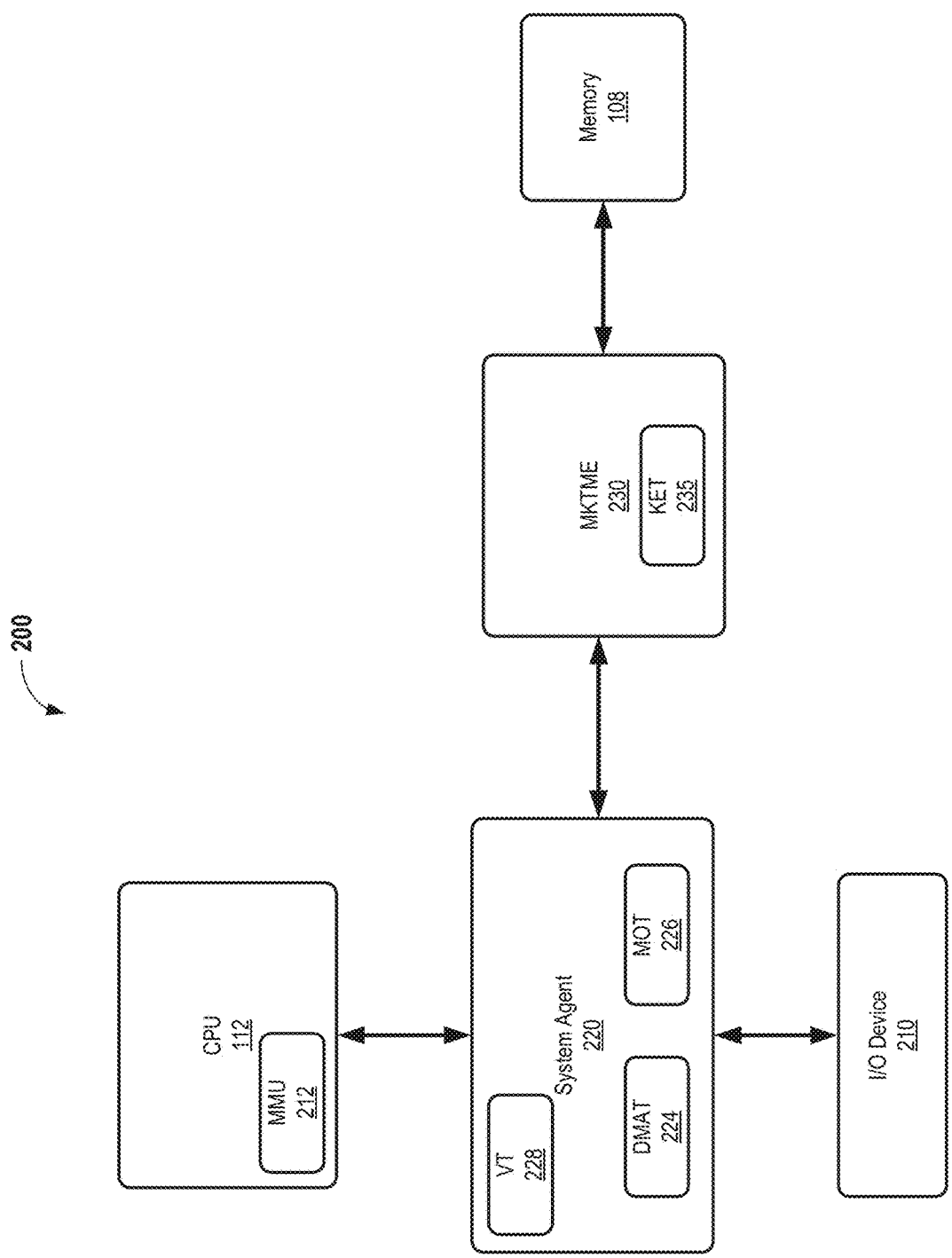
FIG. 2 illustrates one embodiment of a platform.

FIG. 2 illustrates one embodiment of a platform 200. According to one embodiment, platform 200 comprises a TDX platform that provides isolation and data security of tenant VMs in cloud servers. Platform 200 includes a system agent 220 and a Multi-Key Total Memory Encryption (MKTME) engine 230 coupled between CPU 112 and memory 108. In one embodiment, each secure VM operating on platform 200 is referred to as a Trusted Domain (TD), and a corresponding virtual machine monitor (VMM) is implemented to monitor each of the TDs. In a further embodiment, memory 108 comprises a shared resource having private components (e.g., pages) associated with each TD (e.g., TD private memory). In such an embodiment, each component of memory 108 associated with a TD is encrypted and has its integrity protected using a unique key.

A key ID, which is not known to a VMM, may be generated by CPU 112 upon generation of a TD and stored at a Key Encryption Table (KET) 235 within MKTME engine 230. FIG. 3A illustrates one embodiment of a Key Encryption Table. In one embodiment, MKTME engine 230 is a cryptographic engine that is implemented to encrypt data to be stored in, and decrypt data that is to be read from, memory 108. Thus, data stored in TD private memory is encrypted by MKTME engine 230 using the key, while data read from the TD private memory is decrypted by MKTME engine 230. In a further embodiment, key identifiers (or KeyIDs) are implemented to index KET 235. A KeyID for an active TD private memory access (e.g., identified by Private/Shared Bit in a guest physical address (GPA)) is stored in a memory management unit (MMU) 212 in CPU 112 and is transported through Host Physical Address (HPA) bits.

Platform 200 also includes an input/output (I/O) device coupled to system agent 220 via an interface (e.g., a peripheral component interconnect express (PCIe) bus) and may perform direct memory accesses (DMAs) of TD private memory via system agent 220. In one embodiment, system agent 220 comprises an input-output memory management unit (IOMMU). To perform secure DMAs, the authenticity/identity of device requests (e.g., read/write over PCIe) are confirmed. System agent 220 includes a Device Microarchitectural Table (DMAT) 224 to provide such security.

DMAT provides a mapping between KeyIDs, TD identifiers and device identifiers (e.g. Requestor IDs in (or ReqIDs) in form of Bus/Device/Function). FIG. 3B illustrates one embodiment of a DMAT 224. Typically, devices are assigned to VMs in the cloud at boot time (e.g., by a platform manager/VMM). In such embodiments, DMAT 224 is programmed with secure ReqIDs associated with unique TD identifiers (or TDIDs) and corresponding KeyIDs. System agent 220 also includes a Memory Ownership Table (MOT) 226 that provides for a secure incorporation of page assignments. In one embodiment, MOT entries include HPA-GPA mappings, attributes, and an owning TD identifier. FIG. 3C illustrates one embodiment of a MOT 226.

According to one embodiment, DMAT 224 and MOT 226 are used to perform access control checks of TD private memory (e.g., write requests from I/O device 210 to CPU 112 and read requests from device 210 to memory) to ensure that only the correct assigned device/function can access an allocated component (or area) of TD private memory with the proper key (e.g., using keyID). FIG. 4 illustrates one embodiment of access control checks.

A problem with the current architecture is that MKTME engine 230 only supports 64 KeyIDs or key entries for assignment to TDs. Thus, KeyID oversubscription is implemented to ensure that a VMM is able to maintain scalability across hundreds of VMs via secure pre-emption of TDs (e.g., by VMM). Oversubscription uses specific instructions to perform cache line invalidations across packages to reclaim a KeyID for reassigning to other TDs. However significant security issues may occur for DMAs since a KeyID for a TD (e.g., TD1) may be reclaimed and reassigned to another TD (e.g., TD2) during a DMA. Thus, without additional security mechanisms, the TD1 private I/O data may be encrypted and integrity protected with the key for TD2, enabling TD2 to read private DMA data of TD1

According to one embodiment, a mechanism is provided to maintain platform scalability provided by KeyID oversubscription, as well as protects against all cross domain software and hardware attacks on private DMA data. In such an embodiment, all DMA data in platform 200 is cryptographically protected using a single I/O key (e.g., indexed with fixed IOKeyID) to perform secure DMA transfers for each of a plurality of I/O devices. The I/O key may be generated uniquely at every platform 200 reset. In a further embodiment, MOT 226 includes an address translation and attributes for every TD private page and is augmented with an additional I/O field.

In one embodiment, the I/O field is set (e.g., to a logical 1) for a DMA I/O page added via a TDX page addition ISA (TDAUG/ACCEPT). In this embodiment, MMU 212 or system agent 220 inserts the IOKeyID in a final HPA whenever the I/O field in MOT 226 is set. In yet a further embodiment, MKTME 230 utilizes MOT 226 entries for TDs to look up private I/O keys from a pointer (e.g., TDCS) in protected memory and use the pointer for encryption/integrity, or to calculate an integrity measure based on the stored unique Trust Domain Identifier (TDID).

Since a single I/O key is implemented for DMA transfers, KET 235 in MKTME 230 maintains a single key for I/O devices. FIG. 5A illustrates one embodiment of a KET 235 implementing a single key (K3) mapped to IOKeyID. Also, DMAT 224 no longer needs to store mappings between KeyIDs, TD identifiers and device identifiers since every DMA is encrypted with the same I/O key. As shown in FIG. 5B, DMAT 224 now only includes TD identifiers and device identifiers. Similarly, the attributes entry in MOT 226 is modified to indicate whether a DMA page access is for an I/O device. FIG. 5C illustrates such an embodiment of MOT 226.

Figure 6:
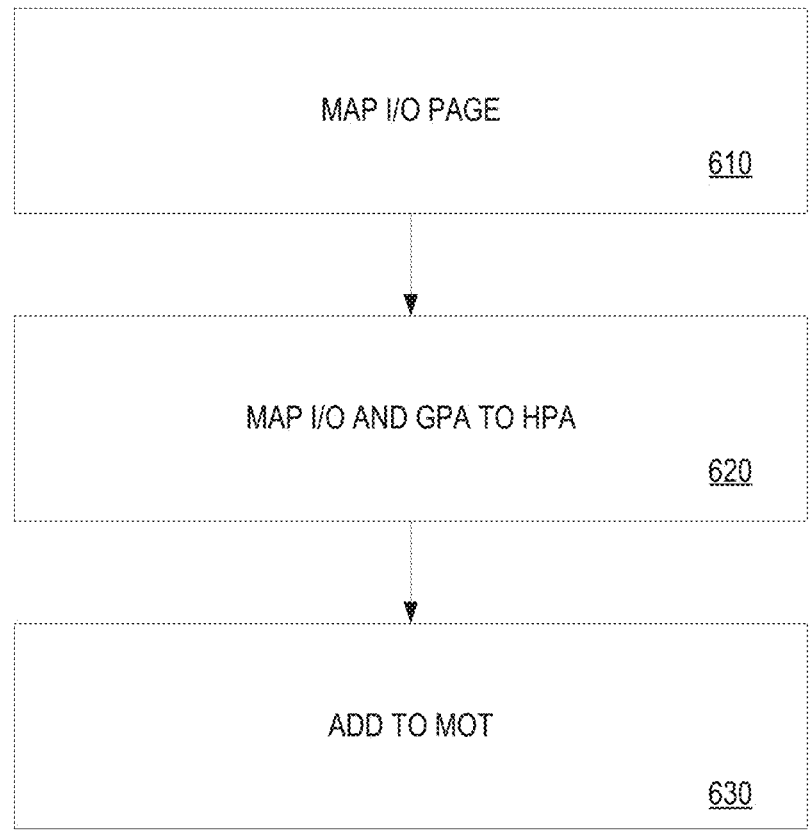
FIG. 6 is a flow diagram illustrating one embodiment of a process for providing a secure DMA page.

FIG. 6 is a flow diagram illustrating one embodiment of a process for assigning a secure DMA page (e.g., private memory page for a DMA transfer) to a single key for I/O devices. At processing block 610, a page assigned to an I/O device (e.g., I/O page) is mapped. In one embodiment, the I/O page is mapped by a para-virtualized guest executing an instruction (e.g., TDCALL) with operands requesting an addition of an I/O page at particular GPA. Otherwise, the guest indicates an I/O page through a specified bit (e.g., $53^{rd}$ bit after a Private/Shared bit) in the GPA. When the guest attempts to access the unmapped page, a violation (e.g., EPT violation) occurs.

In either event, the VMM executes an instruction to map the GPA and I/O page to a HPA, processing block 620. In this embodiment, executes a TDAUGPAGE instruction with regular operands (e.g., TDCS pointer, GPA, HPA, permissions etc.). At processing block 630, the GPA and HPA are stored in MOT 226 with the I/O bit set indicating that the page is accessible by an I/O device. Additionally, the information is stored in a virtualization table (VT) 228 in system agent 220.

Figure 7:
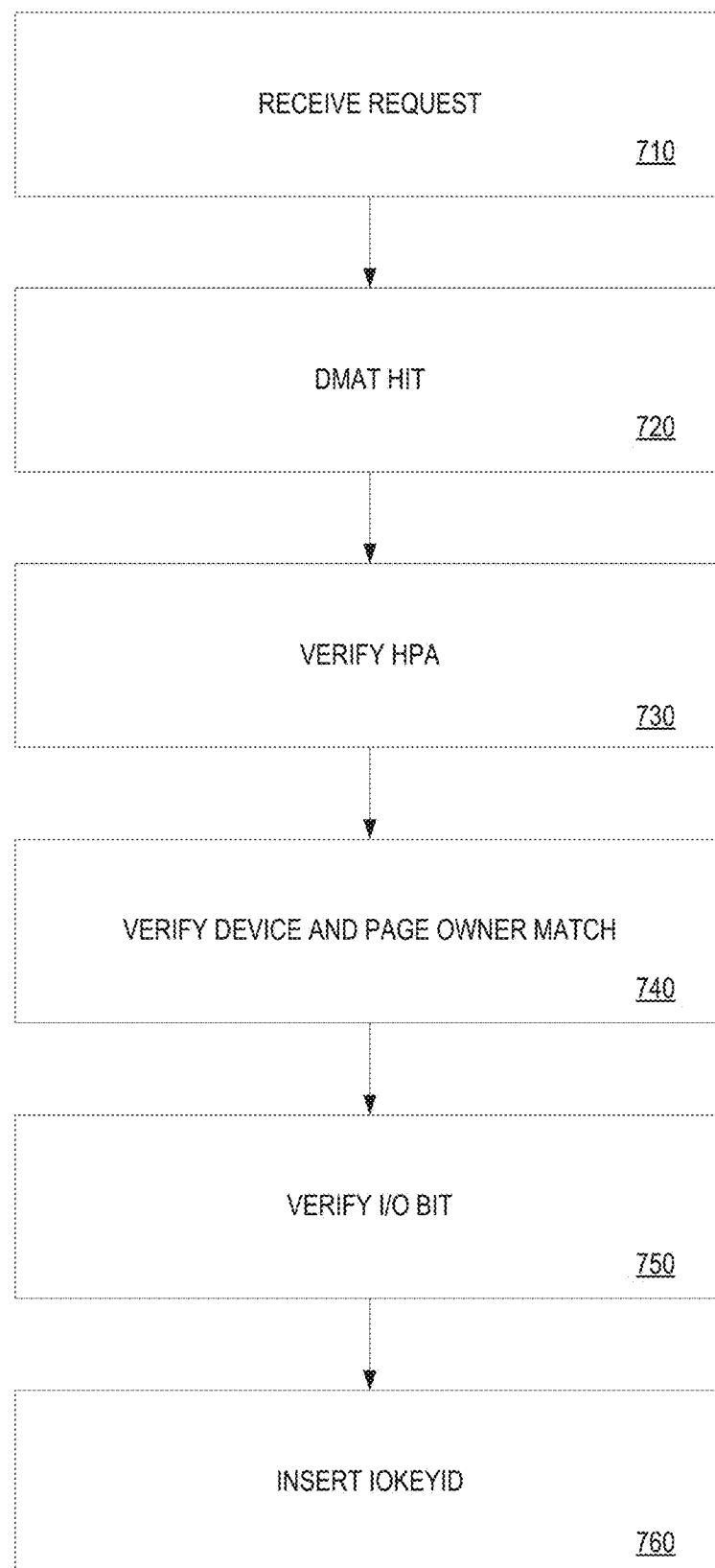
FIG. 7 is a flow diagram illustrating one embodiment of processing a DMA transaction.

FIG. 7 is a flow diagram illustrating one embodiment of processing a DMA. At processing block 710, a DMA request is received at system agent 220 from an I/O device 210. At processing block 720, a hit occurs at DMAT 224 indicating that the I/O device 210 is authorized to access the associated TD private memory page (e.g., the device is TD identifier is assigned to the I/O device identifier) included in the request.

At processing block 730, the HPA from VT 228 is verified by MOT 226. At processing block 740, the device and page owner match is verified. At processing block 750, the MOT 226 MOT I/O bit is verified to be 1 for the destination DMA buffer page. Upon a verification, the fixed platform IOKeyID is inserted into the KeyID bits of the HPA, processing block 760. Subsequently, an encryption key associated with the IOKeyID may be used to access (e.g., encrypt/decrypt) TD private memory. As mentioned above, IOkeyID is immune from reclamation. However, the remaining KeyIDs are free to be reclaimed.

Figure 8A:
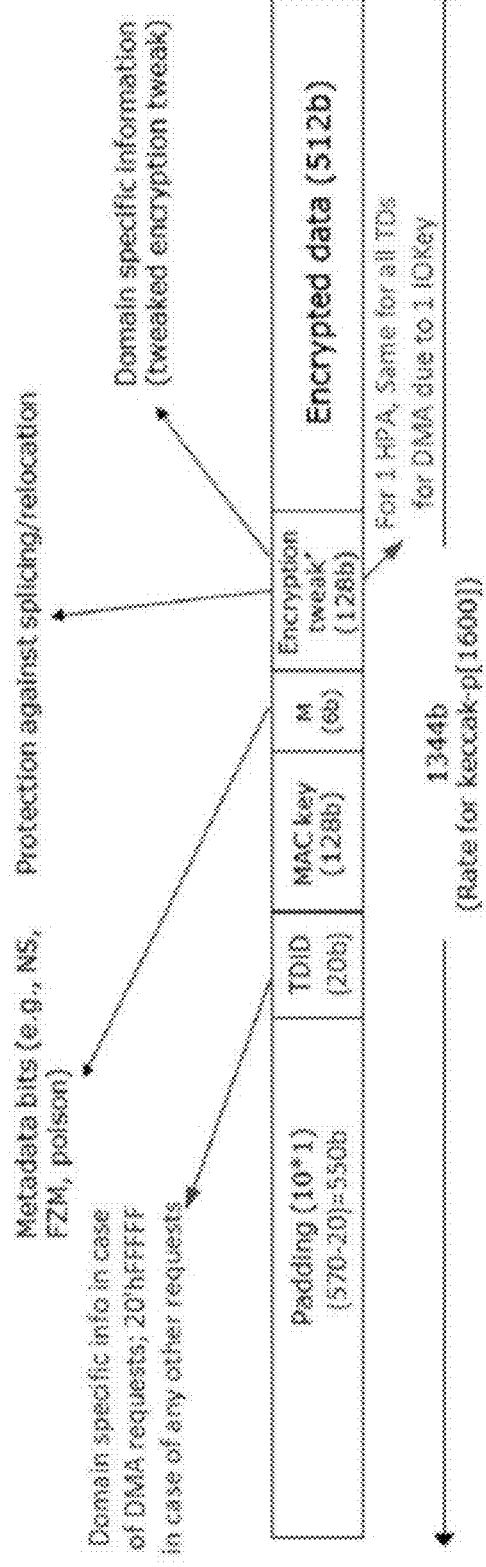
FIG. 8A illustrates one embodiment of an integrity measure construction.

The above-described mechanism may subject to software and hardware based attacks. Thus, MKTME 230 is modified to prevent such attacks. In one embodiment, an integrity measure (e.g., MAC calculation) may include a value unique to DMA accesses made by a particular TD. In such an embodiment, the TD identifier value is set and managed by CPU 112. In a further embodiment, the TD identifier value may be a 16 bit identifier (e.g., an existing VMID or the unique TDCS pointer, pointing to the TD's TDCS structure inside TDPM). FIG. 8A illustrates one embodiment of a MAC construction.

Figure 8B:
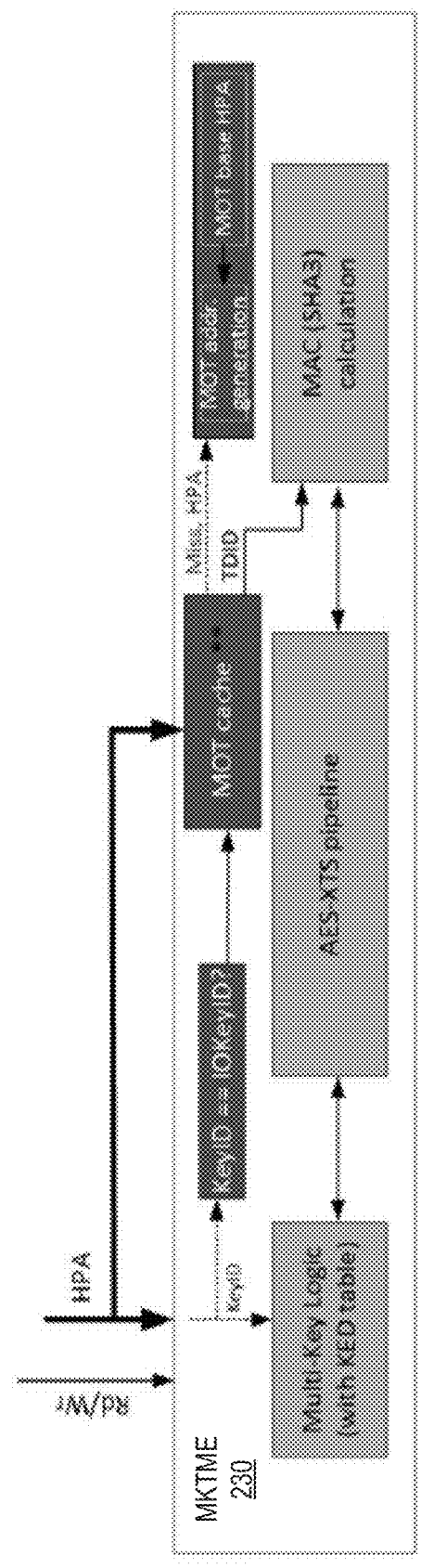
FIG. 8B illustrates one embodiment of a Multi-Key Total Memory Encryption engine.

The TD identifier may be stored in the MOT to determine page ownership. In such an embodiment, the TD identifier based page ownership is tested against device ownership as one of the checks as part of IOMMU walks and MOT fetch. To accommodate implementation of the TD identifier, MKTME engine 230 is modified as shown in FIG. 8B in which MKTME engine 230 receives the KeyID as part of the HPA. For secure I/O, MKTME engine 230 performs additional operations upon a determination that the extracted KeyID=fixed IOKeyID. Subsequently, MKTME engine 230 generates access requests to a MOT cache based on the received HPA. Based on the MOT cache lookup, the TDID value is obtained for the corresponding HPA entry. As discussed above, the TDID is incorporated into the MAC construction input (e.g., Secure Hash Algorithm 3 SHA-3)) for calculating the final integrity value, as shown in FIG. 8A. In one embodiment, the MAC is calculated on the encrypted data, and encryption is not modified with the TDID value.

Figure 9:
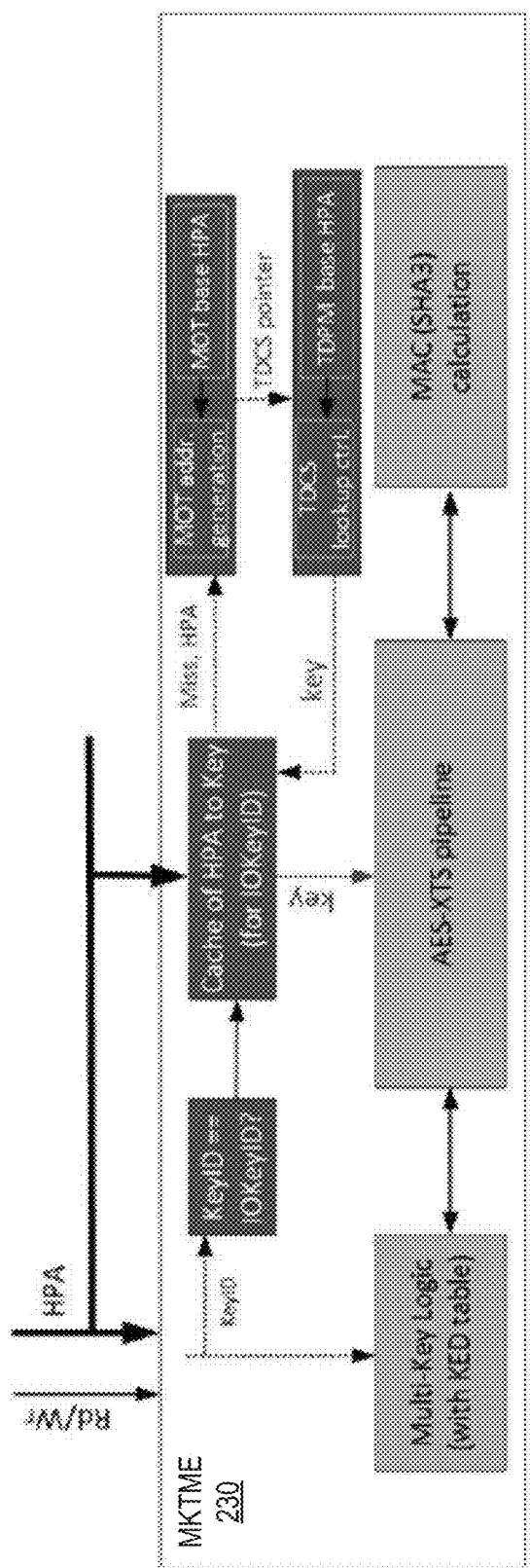
FIG. 9 illustrates another embodiment of a Multi-Key Total Memory Encryption engine.

In an alternative security approach, the IOKeyID is also received in the KeyID bits of the full HPA at MKTME engine 230 for DMA accesses. However, there is no corresponding IOKey programmed in MKTME engine 230 for cryptographic protection of the DMA data. In this embodiment, the IOKeyID setting in the HPA serves as an indication of secure DMA requests to MKTME engine 230. FIG. 9 illustrates another embodiment of a MKTME engine 230 security modification. Similar to discussed above with reference to FIG. 8B, an implicit MOT look up is performed to obtain the TD identifier (TDID) corresponding to the HPA of memory request (in this case DMA).

In one embodiment, it is assumed that the TDIDs are the unique TDCS pointers. Upon obtaining the TDCS pointer in MKTME engine 230, the corresponding TDCS is looked up with the pointer to obtain the key to be used for encryption and integrity calculations. In this embodiment, each TD has one key used for cryptographic protection for all memory requests. Alternatively, there is only one separate I/O key per TD (e.g., along with the key). As a result, the key used for cryptographic protection of all DMA accesses is obtained from the owner TD's TDCS. Since the single IOKeyID does not correspond to any physical key in this embodiment, reclamation does not apply to IOKeyID. Even if all other private KeyIDs can be reclaimed by TDRM during suspending of TDs, assigned to other active TDs and the keys reprogrammed on MKTME corresponding to all packages, the corresponding TD keys are stored securely in the TDCS in TDPM. Accordingly, the key to be used for encryption and integrity protection can always be obtained from the corresponding TDCS.

Based on the above, the TDID (e.g., TDCS pointer) is obtained from the MOT and the TDCS from the corresponding HPA, and is looked up to obtain the key. As a result, instead of a MOT cache as in the previous approach, a structure is included in MKTME engine 230 to cache the HPA to final key, as shown in FIG. 9. In this embodiment, reads after initial DMA writes hit in this cache structure and the key may be obtained in 1-2 clock cycles, thereby ready for decryption and MAC verification once the memory read returns. Large page sizes could help in fitting more entries in this cache structure.

Figure 10:
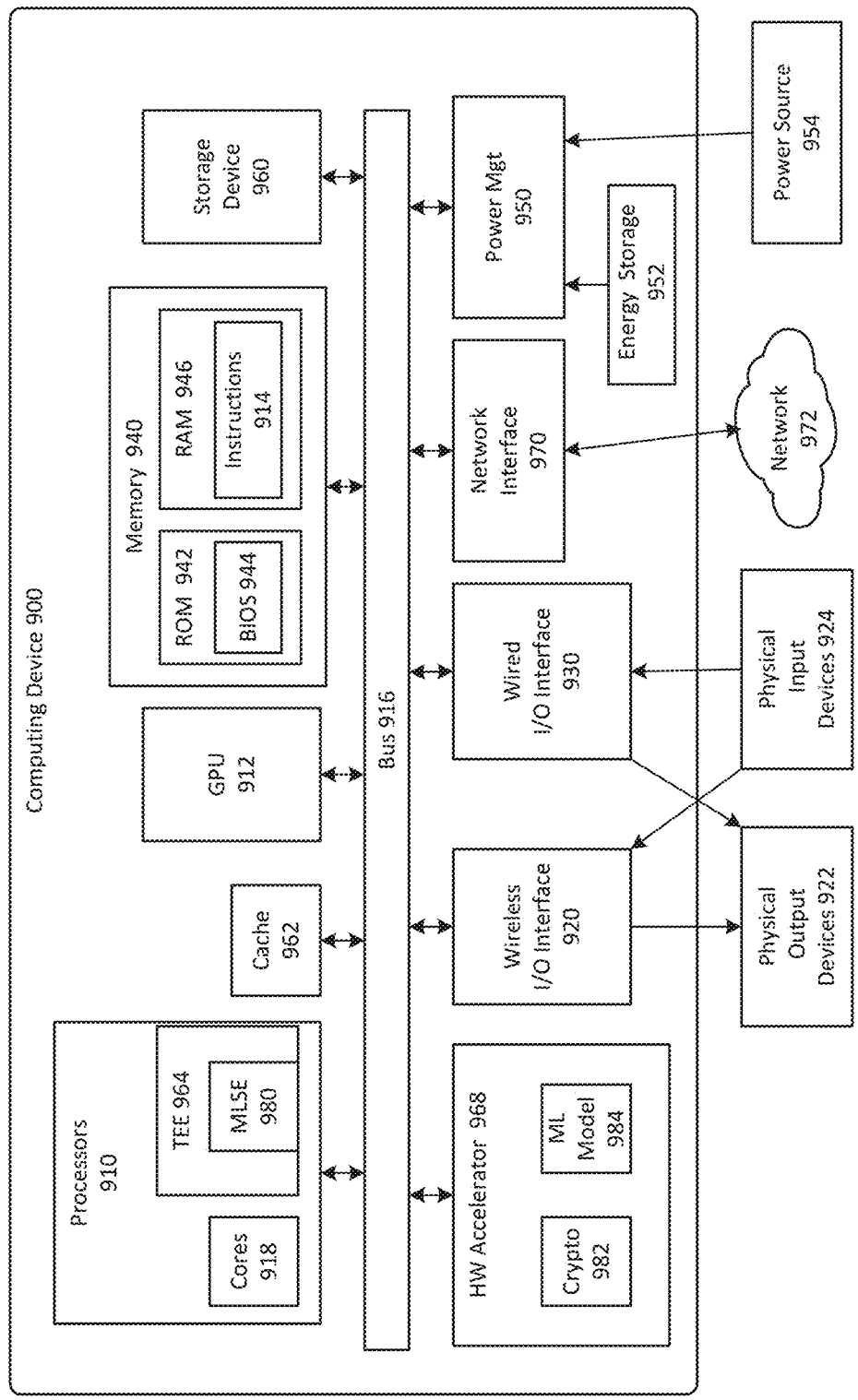
FIG. 10 illustrates one embodiment of a schematic diagram of an illustrative electronic computing device.

FIG. 10 is a schematic diagram of an illustrative electronic computing device to enable enhanced protection against adversarial attacks according to some embodiments. In some embodiments, the computing device 900 includes one or more processors 910 including one or more processors cores 918 and a Trusted Execution Environment (TEE) 964, the TEE including a machine learning service enclave (MLSE) 980. In some embodiments, the computing device 900 includes a hardware accelerator (HW) 968, the hardware accelerator including a cryptographic engine 982 and a machine learning model 984. In some embodiments, the computing device is to provide enhanced protections against ML adversarial attacks, as provided in FIGS. 1-9.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 942 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate security of a shared memory resource, comprising a memory device to store memory data, wherein the memory device comprises a plurality of private memory pages associated with one or more trusted domains and a cryptographic engine to encrypt and decrypt the memory data, including a key encryption table having a key identifier associated with each trusted domain to access a private memory page, wherein a first key identifier is generated to perform direct memory access (DMA) transfers for each of a plurality of input/output (I/O) devices.

Example 2 includes the subject matter of Example 1, further comprising a system agent including a memory ownership table to indicate a trusted domain having ownership of each of the private memory pages.

Example 3 includes the subject matter of Examples 1 and 2, wherein the memory ownership table includes a plurality of attributes, including an I/O attribute bit to indicate whether access to a private memory page comprises an access by an I/O device.

Example 4 includes the subject matter of Examples 1-3, further comprising a central processing unit (CPU) to assign a private memory page for a DMA transfer to the first key identifier.

Example 5 includes the subject matter of Examples 1-4, wherein assigning the private memory page comprises mapping an I/O page to a guest physical address.

Example 6 includes the subject matter of Examples 1-5, wherein assigning the private memory page further comprises mapping the I/O page and the guest physical address to a host physical address.

Example 7 includes the subject matter of Examples 1-6, wherein assigning the private memory page further comprises storing the guest physical address and the host physical address in the memory ownership table and setting the I/O attribute bit in the memory ownership table to indicate that that the private memory page is accessible by the I/O device.

Example 8 includes the subject matter of Examples 1-7, wherein the system agent processes DMA transfers.

Example 9 includes the subject matter of Examples 1-8, wherein the system agent receives a DMA transfer request from an I/O device and checks a table to verify whether the I/O device is authorized to access a private memory page included in the request.

Example 10 includes the subject matter of Examples 1-9, wherein an I/O key identifier is inserted into key identifier bits within a host physical address upon verifying that the I/O device is authorized to access the private memory page.

Example 11 includes the subject matter of Examples 1-10, using an encryption key associated with the I/O key identifier to access the private memory page.

Example 12 includes the subject matter of Examples 1-11, wherein the encryption engine accesses the memory ownership table to retrieve a trusted domain identifier (TDID) associated with a DMA access to be performed by a trusted domain having ownership of a private memory page and generate an integrity value based on the TDID.

Example 13 includes the subject matter of Examples 1-12, wherein the integrity value is unique to the DMA access to be performed by the trusted domain.

Example 14 includes the subject matter of Examples 1-13, wherein the first key identifier is generated during a system boot and is not reclaimable.

Some embodiments pertain to Example 15 that includes a method to facilitate security of a shared memory resource, comprising generating a plurality of key identifiers to be associated with a private memory page associated with one or more trusted domains, wherein plurality of key identifiers comprises a first key identifier to perform direct memory access (DMA) transfers for each of a plurality of input/output (I/O) devices.

Example 16 includes the subject matter of Example 15, further comprising assigning a private memory page for a DMA transfer to the first key identifier.

Example 17 includes the subject matter of Examples 15 and 16, wherein assigning the private memory page comprises mapping an I/O page to a guest physical address, mapping the I/O page and the guest physical address to a host physical address, storing the guest physical address and the host physical address in a memory ownership table and setting an I/O attribute bit in the memory ownership table to indicate that that the private memory page is accessible by the I/O device.

Example 18 includes the subject matter of Examples 15-17, further comprising processing DMA transfers.

Example 19 includes the subject matter of Examples 15-18, wherein processing the DMA transfers comprises receiving a DMA transfer request from an I/O device and checking a table to verify whether the I/O device is authorized to access a private memory page included in the request.

Example 20 includes the subject matter of Examples 15-19, wherein processing the DMA further transfers comprises inserting an I/O key identifier into key identifier bits within a host physical address upon verifying that the I/O device is authorized to access the private memory page and using an encryption key associated with the I/O key identifier to access the private memory page.

Some embodiments pertain to Example 21 that includes at least one computer-readable medium having instructions, which when executed by a processor, causes the processor to generate a plurality of key identifiers to be associated with a private memory page associated with one or more trusted domains, wherein plurality of key identifiers comprises a first key identifier to perform direct memory access (DMA) transfers for each of a plurality of input/output (I/O) devices.

Example 22 includes the subject matter of Examples 20 and 21 having instructions, which when executed by a processor, further causes the processor to assign a private memory page for a DMA transfer to the first key identifier, including mapping an I/O page to a guest physical address, mapping the I/O page and the guest physical address to a host physical address, storing the guest physical address and the host physical address in a memory ownership table and setting an I/O attribute bit in the memory ownership table to indicate that that the private memory page is accessible by the I/O device.

Example 23 includes the subject matter of Examples 20-22 having instructions, which when executed by a processor, further causes the processor to process DMA transfers, including receiving a DMA transfer request from an I/O device, checking a table to verify whether the I/O device is authorized to access a private memory page included in the request, inserting an I/O key identifier into key identifier bits within a host physical address upon verifying that the I/O device is authorized to access the private memory page and using an encryption key associated with the I/O key identifier to access the private memory page.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
   a memory device to store memory data, wherein the memory device comprises a plurality of private memory pages associated with one or more trusted domains; and
   a cryptographic engine to encrypt and decrypt the memory data, including a key encryption table having a key identifier associated with each trusted domain to access a private memory page, wherein a first key identifier is generated to perform direct memory access (DMA) transfers for each of a plurality of input/output (I/O) devices; and
   an input-output memory management unit (IOMMU) including a memory ownership table to indicate a trusted domain having ownership of each of the private memory pages, wherein the memory ownership table includes an I/O attribute bit to indicate whether access to a private memory page comprises an access by an I/O device for a DMA transfer.

2. The apparatus of claim 1, further comprising a central processing unit (CPU) to assign a private memory page for a DMA transfer to the first key identifier.

3. The apparatus of claim 2, wherein assigning the private memory page comprises mapping an I/O page to a guest physical address.

4. The apparatus of claim 3, wherein assigning the private memory page further comprises mapping the I/O page and the guest physical address to a host physical address.

5. The apparatus of claim 4, wherein assigning the private memory page further comprises storing the guest physical address and the host physical address in the memory ownership table and setting the I/O attribute bit in the memory ownership table to indicate that that the private memory page is accessible by the I/O device.

6. The apparatus of claim 5, wherein the IOMMU processes DMA transfers.

7. The apparatus of claim 6, wherein the IOMMU receives a DMA transfer request from an I/O device and checks a table to verify whether the I/O device is authorized to access a private memory page included in the request.

8. The apparatus of claim 7, wherein an I/O key identifier is inserted into key identifier bits within a host physical address upon verifying that the I/O device is authorized to access the private memory page.

9. The apparatus of claim 8, using an encryption key associated with the I/O key identifier to access the private memory page.

10. The apparatus of claim 8, wherein the cryptographic engine accesses the memory ownership table to retrieve a trusted domain identifier (TDID) associated with a DMA access to be performed by a trusted domain having ownership of a private memory page and generate an integrity value based on the TDID.

11. The apparatus of claim 10, wherein the integrity value is unique to the DMA access to be performed by the trusted domain.

12. The apparatus of claim 1, wherein the first key identifier is generated during a system boot and is not reclaimable.

13. A method to facilitate security of a shared memory resource, comprising:
generating a plurality of key identifiers to be associated with a private memory page associated with one or more trusted domains, wherein plurality of key identifiers comprises a first key identifier to perform direct memory access (DMA) transfers for each of a plurality of input/output (I/O) devices; and
assigning a private memory page for a DMA transfer to the first key identifier, including:
mapping an I/O page to a guest physical address;
mapping the I/O page and the guest physical address to a host physical address;
storing the guest physical address and the host physical address in a memory ownership table; and
setting an I/O attribute bit in the memory ownership table to indicate that that the private memory page is accessible by an I/O device for a DMA transfer.

14. The method of claim 13, further comprising processing DMA transfers.

15. The method of claim 14, wherein processing the DMA transfers comprises:
receiving a DMA transfer request from an I/O device; and
checking a table to verify whether the I/O device is authorized to access a private memory page included in the request.

16. The method of claim 15, wherein processing the DMA transfers further comprises:
inserting an I/O key identifier into key identifier bits within a host physical address upon verifying that the I/O device is authorized to access the private memory page; and
using an encryption key associated with the I/O key identifier to access the private memory page.

17. At least one computer-readable medium having instructions, which when executed by a processor, causes the processor to:
generate a plurality of key identifiers to be associated with a private memory page associated with one or more trusted domains, wherein plurality of key identifiers comprises a first key identifier to perform direct memory access (DMA) transfers for each of a plurality of input/output (I/O) devices; and
assign a private memory page for a DMA transfer to the first key identifier, including:
mapping an I/O page to a guest physical address;
mapping the I/O page and the guest physical address to a host physical address;
storing the guest physical address and the host physical address in a memory ownership table; and
setting an I/O attribute bit in the memory ownership table to indicate that that the private memory page is accessible by an I/O device for a DMA transfer.

18. The computer-readable medium of claim 17, having instructions, which when executed by a processor, further causes the processor to process DMA transfers, including:
receiving a DMA transfer request from an I/O device;
checking a table to verify whether the I/O device is authorized to access a private memory page included in the request;
inserting an I/O key identifier into key identifier bits within a host physical address upon verifying that the I/O device is authorized to access the private memory page; and
using an encryption key associated with the I/O key identifier to access the private memory page.

* * * * *